| PUMP OUTPUT SETTING POUNDS PER MINUTE | | | | | | | | | TARGET COATING WEIGHT 15 LBS. 3000 FT. | |
|---|---|---|---|---|---|---|---|---|---|---|
| | SPEED OF WEB | | | | | | | | | |
| WEB WIDTH | 200 | 250 | 300 | 350 | 400 | 450 | 500 | 550 | 600 | |
| 30 | 2.5 | | 3.8 | | 5.0 | | 6.7 | | 7.5 | |
| 32 | | | | | | | | | | |
| 34 | | | | | | | | | | |
| 36 | 3.0 | | 4.5 | | 6.0 | | 7.5 | | 9.0 | |
| 38 | | | | | | | | | | |
| 40 | | | | | | | | | | |
| 42 | | | | | | | | | | |
| 44 | | | | | | | | | | |
| 46 | | | | | | | | | | |
| 48 | 4.0 | | 6.0 | | 8.0 | | 10.0 | | 12.0 | |
| 50 | | | | | | | | | | |
| 52 | | | | | | | | | | |
| 54 | | | | | | | | | | |
| 56 | | | | | | | | | | |
| 58 | | | | | | | | | | |
| 60 | | | | | | | | | | |

# United States Patent Office 3,556,832
Patented Jan. 19, 1971

3,556,832
METHOD AND APPARATUS FOR APPLYING BARRIER COATING SUBSTANCES TO SHEET MATERIALS
George C. Park, 22 Mount Vernon St., North Reading, Mass. 01864
Continuation-in-part of application Ser. No. 806,040, Mar. 6, 1969, which is a continuation of application Ser. No. 335,607, Jan. 3, 1964. This application Mar. 12, 1969, Ser. No. 806,473
Int. Cl. B44d 1/09
U.S. Cl. 117—7
6 Claims

ABSTRACT OF THE DISCLOSURE

A barrier coating of the high viscosity "hot melt" class is applied with high uniformity to a moving web by means of a coating apparatus which is capable of operating at speeds as high as 1,500 feet per minute utilizing "hot melt" compounds of viscosities ranging as high as 100,000 cps. The coating fluid in a heated condition is applied from a coating head consisting of a tubular body formed with an elongated aperture over which the web is passed. The coating fluid is under relatively high pressures of varying intensity. Pressure drops towards the center of the coating tube, induced by friction of high viscosity materials and increasingly high flow rates, is controlled by regulating web pressure. Multiple tensioning means are arranged at two opposite sides of the coating tube. One tensioning device engages the web as it approaches the coating head and acts initially to exert cross tension and stretch the web sufficiently to overcome variations in caliper and web length. A second tensioning device exerts linear tension to force the transversely stretched web uniformly against the coating tube with sufficient web pressure to equalize and balance pumping pressure of fluid all along the coating aperture. Required web pressures of a magnitude necessitating linear tension in excess of the tensile strength of any given web is provided by means of a web press roll supported in rolling contact with the web immediately above the elongated tube aperture. A variable speed power driven winding roll means for the web is interlocked with a variable speed pump mechanism for synchronizing web speed and pumping rate. A dual reading indicator constantly indicates respective web speeds and pumping rates to the machine operator.

---

This application is a continuation-in-part of my co-pending application, Ser. No. 806,040, filed Mar. 6, 1969, now abandoned, which application is a continuation of my application, Ser. No. 335,607, filed Jan. 3, 1964, now abandoned.

The present invention relates to a method and apparatus for applying a barrier coating substance to sheet materials of the class including paper webs, films, foil, fabrics, and the like. More particularly, the invention is concerned with a coating apparatus of the class in which a coating tubular coating head including an elongated discharge aperture is employed. It is contemplated that the coating substance may be applied as a single coating or in the form of successive coatings, one applied to function as an outer protective surface on one or both sides of a single layer of material. The coating substance may also be employed as an adhesive or bonding agent for laminating two or more webs of material together.

In coating a web of material with a slotted coating tube through opposite ends of which a high viscosity coating fluid is forced, a commonly experienced difficulty is failure to apply the coating in a uniform thickness all the way across the web. This may occur largely because of pressure drop toward the center of the tube due to increased friction. As a result, greater internal pumping pressure is exerted at the outer ends of the tube aperture or slot than at the center.

While such difficulties are subject to some degree of control when using ordinary solvent and emulsion-type coating materials applied at relatively low flow rates, a much greater problem is present when dealing with high viscosity materials discharged at relatively high pressures to provide increasing higher flow rates. Under such conditions greater web pressure, normally induced by increasing linear tension, becomes necessary to maintain the web against the coating tube or head and for some coating operations, the requirement for added tension may exceed the tensile strength of the web with consequent breaking.

A further condition which manifests itself is the tendency for high viscosity material supplied at higher flow rates to displace any portions of the web which are slack or which are subject to variations in caliper or length. Furthermore, substantially increased tension forces exerted linearly of a web having slack or non-uniform portions may tend to draw the web undesirably and in this way also unsatisfactory coating will occur.

It is, in general, therefore, a chief object of this invention to deal with the problem indicated above and to provide an improved method for applying barrier coating substances of relatively high viscosities utilizing a tubular type coating head. It is a further object of the invention to devise a coating apparatus which includes novel means for controlling web pressure and web tension in combination with a tubular type coating head and to utilize the coating apparatus in coating thermoplastic compounds of the class commonly referred to as "hot melt" compounds which may have relatively high viscosities in a viscosity range running as high as 100,000 cps.

Another object of the invention is to devise a method and apparatus for applying high viscosity coatings to webs which are subject to variation in caliper and length in order to insure application of highly uniform layers and elimination of streaks or lines resulting from particles being collected in the coating equipment.

Another object of the invention is to provide a coating method and apparatus by means of which web speed and pumping rates may be synchronized and a continuous indication of both web speed and pumping rates may be visually presented to a machine operator so that a more efficient coating operation may be realized.

Another object is to provide a method for carrying out a controlled penetration of a web with a high degree of curl resistance being realized so that the coated web in a finished state will readily lie flat and resist rolling up upon itself.

Still a further object is to provide a novel method of applying successive coatings to a web while the coatings are in a partially set condition in order to achieve novel protective features in a coated paper.

The nature of the invention and its other objects and novel features will be more fully understood and appreciated from the following description of a preferred embodiment of method and apparatus selected for purposes of illustration and shown in the accompanying drawings in which.

As earlier noted, the coating method and apparatus of the invention in one preferred embodiment is designed to handle "hot melt" materials of the class which may require heating to temperatures as high as 400 degrees F. and which may occur in a viscosity range running as high as 100,000 cps. The invention will, therefore, be described with reference to the use of these high viscosity coating materials although it should be understood that this is not done in a limiting sense and various other classes of coating materials may be employed in the invention method.

With this preferred embodiment of the invention method, it is contemplated that webs may be coated in a range of widths of from 30 to 64 inches or more at speeds running as high as 1,500 feet per minute and providing coating weights of from 2 pounds up to 40 pounds or more. Coating may be applied to cover one side or two sides of a web and the method may also be employed to coat, laminate with a second web, and again coat all in one pass through the machine.

In carrying out the method in its preferred form and handling high viscosity coating materials, I have discovered that I may employ specially controlled web tensions and web pressures in combination with a tubular type coating head and I have devised as one important feature of the invention multiple tensioning means arranged at two opposite sides of the coating head in relatively depressed positions.

The multiple tensioning means acts on the web as it leaves a supply roll and approaches the coating head and operates initially to exert cross tension forces of a magnitude which may stretch the web transversely in sufficient degree to overcome variations in caliper and length of the web.

This cross tensioning step of the invention is essential to successful use of linear tension and linear tension as further exerted through the multiple tensioning means acts to force the transversely stretched web uniformly against the coating head with adequate pressure to equalize and balance variable pumping pressures of high viscosity fluid along the coating head and thus the problem of pressure drop from friction may be controlled.

I have further discovered that in some coating operations, where very high viscosities and high flow rates may require web pressures of a magnitude necessitating linear tension in excess of the tensile strength of the web, I may provide additional web pressure at the coating head by employing a special web press roll supported in rolling contact with the web immediately above the coating head aperture.

I have further determined that in controlling web tension and web pressure in the manner disclosed, it is important to maintain web speed and pumping rate in constantly regulated relationship to one another in order to apply precisely controlled coating weight to the web.

In this connection, I have still further devised a novel interlocking drive mechanism for actuating both web winding means and fluid pumping means so that web speed and pumping rate in pounds per minute may be synchronized in a desirable manner.

I have still further devised a unique flowmeter and indicator apparatus by means of which the synchronized web speed and pumping rate are visually indicated to an operator at all times. For use with the indicator apparatus, I have in addition also provided novel chart means for monitoring machine operation in accordance with a desired coating weight to be applied.

Considering in more detail the apparatus of the invention, I employ a coating head having a tubular coating element formed with an elongated aperture. Heated coating fluid is forced through opposite ends of the tube under pumping pressure. The heated coating fluid is discharged through the elongated aperture from a confined space which is substantially sealed at one side. Sealing is accomplished by continuously advancing portions of the web under tension and in overlapping relation to opposite ends of the elongated aperture so that material is coated on the web at points inside of the edges of the web at all times.

Figure 1:
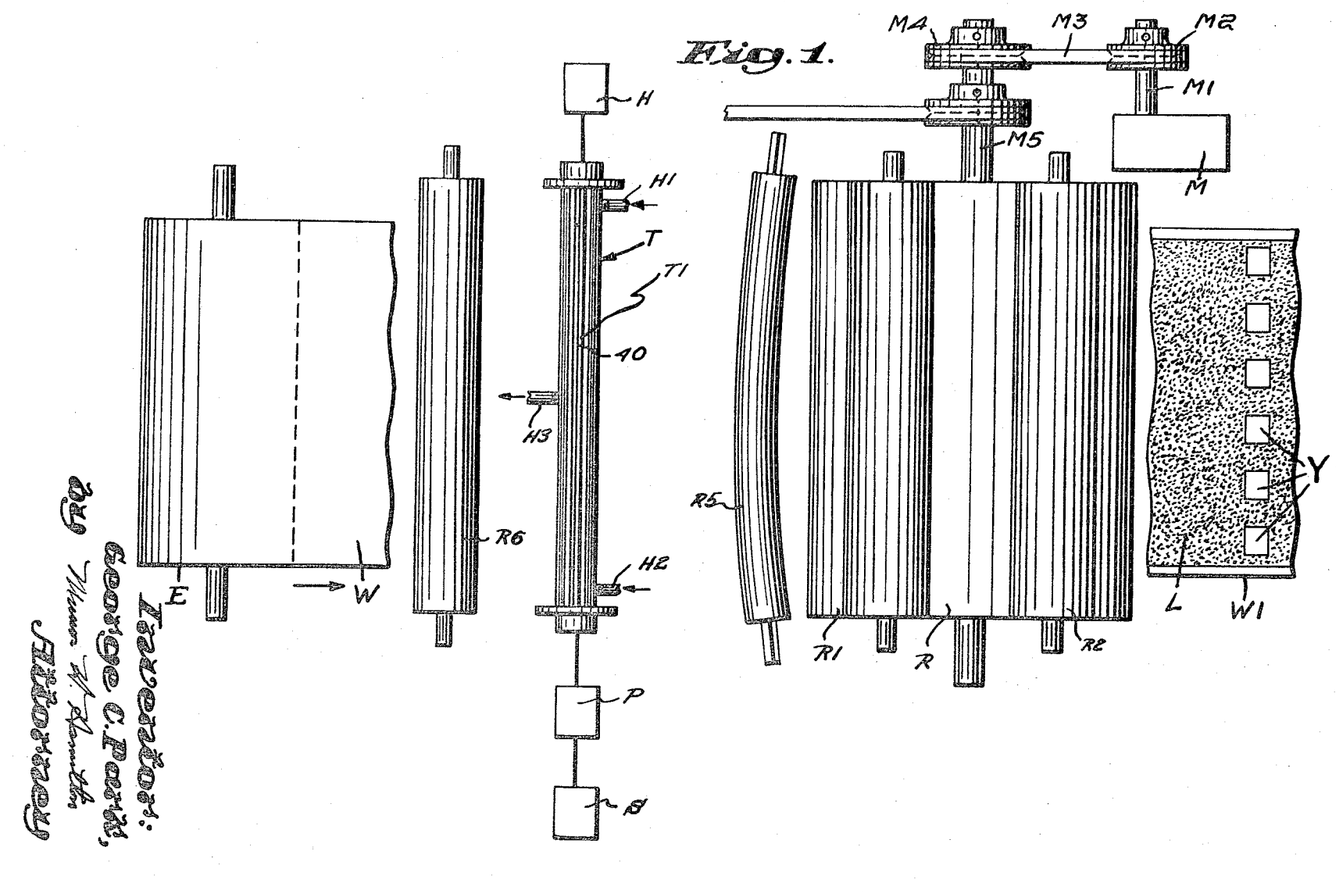
FIG. 1 is a plan view illustrating schematically a web and apparatus employed in coating the web with a high viscous coating material.

Attention is directed to FIG. 1 wherein I have illustrated a supply roll E from which a web of material W is drawn off by winding roll means and subjected to a coating operation to provide a coated material W1 having a coating L at the underside thereof. The material W may consist of a cellulosic web and the coating may consist of a thermoplastic coating substance applied from the heated tubular coating head generally indicated by arrow T and including a tubular coating element T1. As suggested diagrammatically in FIG. 1, heated coating substance of heavy viscosity may, for example, be delivered from a supply source S by a pump P to the coating element T1. A heating medium such as a source of steam at H is arranged to provide a circulation of heat to a heat conducting body in the tubular coating element T1 through inlets H1 and H2 and an outlet H3. These components are further illustrated in FIG. 3 wherein the pump P and a container for coating substance are shown supported in bracket member 4 and 6 on frame side 2.

The web W is continuously advanced at desired speeds by winding roll means as R, R1 and R2 indicated at the upper righthand side of FIG. 1. Also provided is a variable speed power drive for controlling the web speed through the machine. The variable speed power drive may, for example, include a variable speed motor M which drives a shaft M1 having a sprocket M2 and chain M3 in turn meshing with a sprocket M4 on a shaft M5 of winding roll R.

Figure 2:
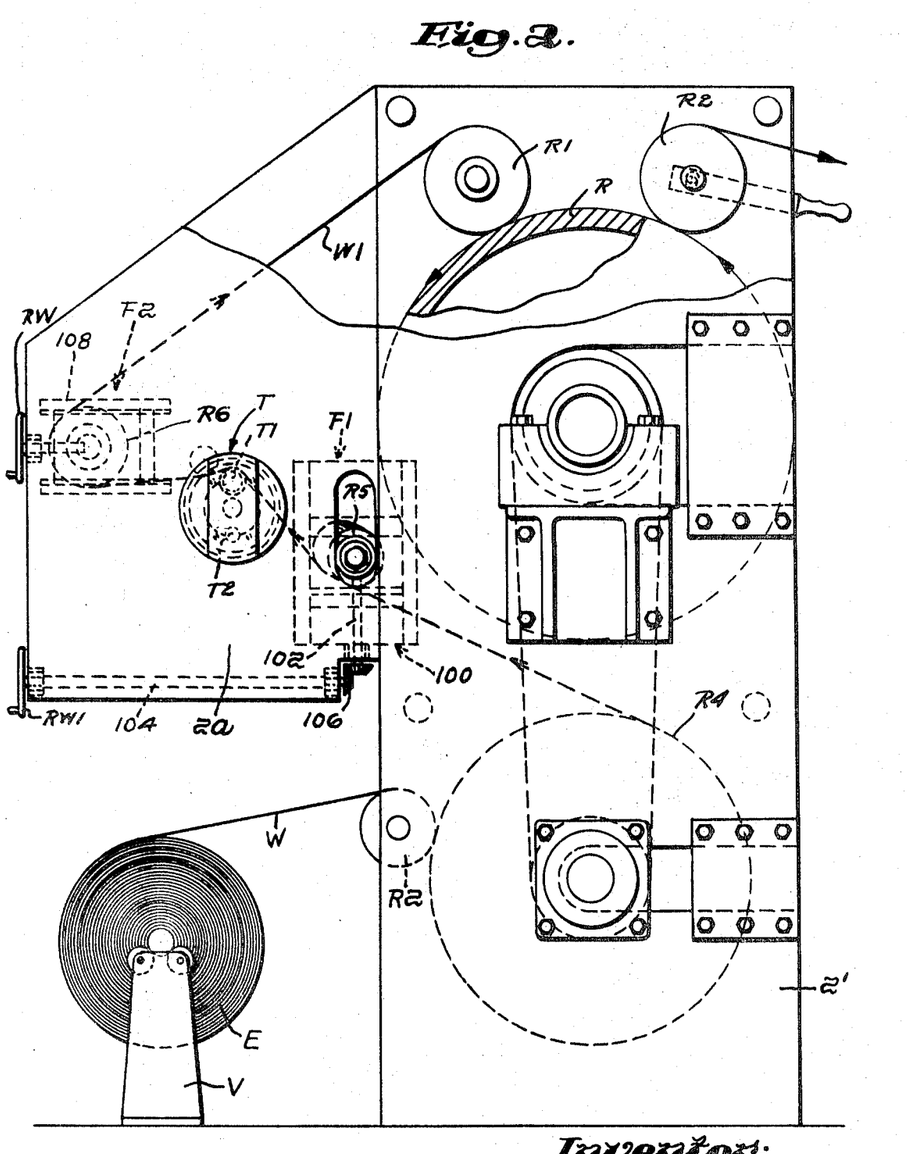
FIG. 2 is a side elevational view further illustrating a web moving through the coating apparatus of the invention and particularly indicating multiple tensioning means.

In accordance with the preferred embodiment of the invention, I combine with the web winding and coating head means referred to special multiple tensioning means more clearly shown in FIG. 2 and constituting an important and essential feature of the invention method. The multiple tensioning means includes tensioning devices which are so designed and combined with the coating head T that both variation in web caliper and length as well as variation in pumping pressure at the coating head may be simultaneously dealt with and controlled.

Attention is directed to FIG. 2 wherein it will be observed that the web W is drawn off from the supply roll E under a tension which is induced by the power driven winding roll R at R/R1 and braked at R3/R4 which may be of any given intensity common to typical winding speeds.

In addition to this winding tension, I provide for additional tensioning of the web by means of multiple tensioning devices located at either side of the coating head T and in depressed positions such that tensioning forces are exerted from points below the top of the coating tube T1 in both cases.

Figure 3:
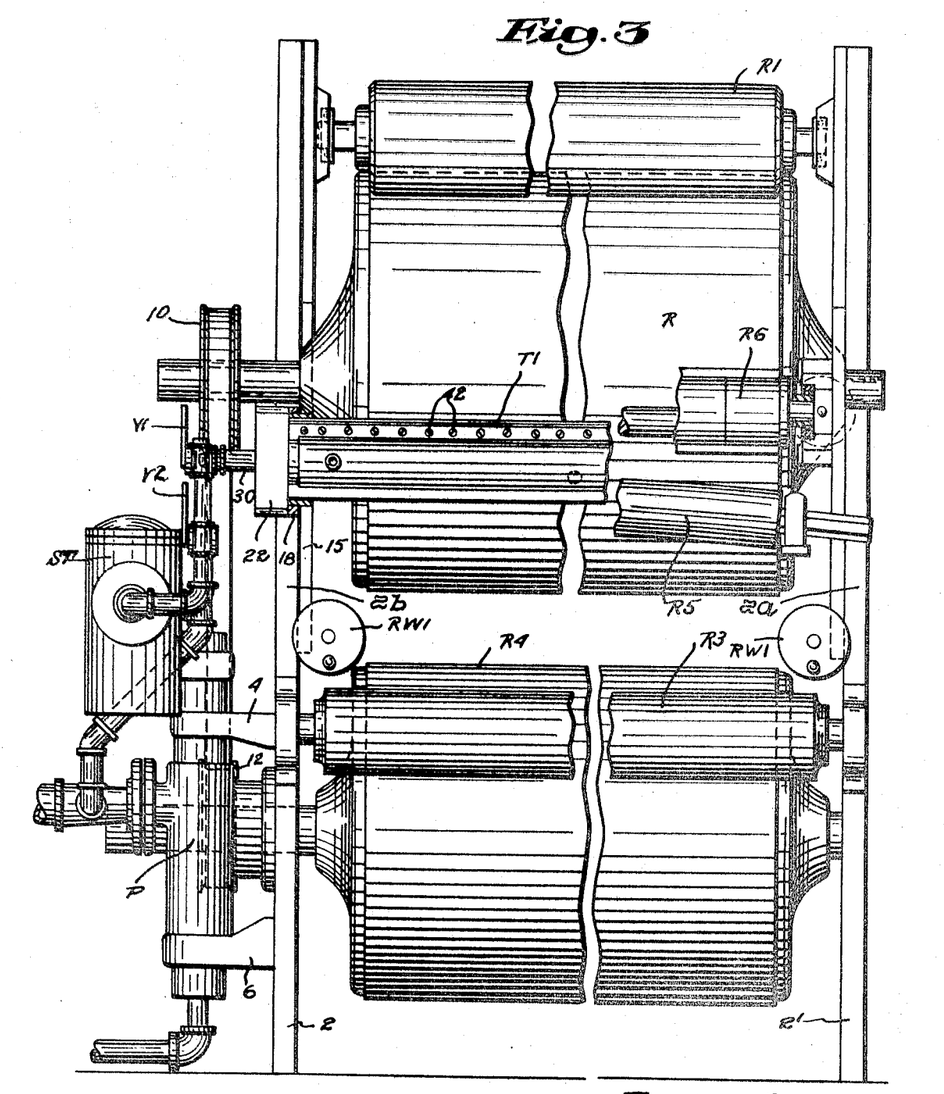
FIG. 3 is a front elevational view of the apparatus shown in FIG. 2.

The multiple tensioning devices are shown in detail in FIGS. 2 and 3 together with the coating head T and web guiding means. As shown in FIGS. 2 and 3 a roll stand V supports a roll of material from which the web W is continuously drawn off by a nip (R3/R4) and then over a preheating roll R4. These rolls are supported between frame sides 2 and 2' having extensions 2a and 2b and between the extensions 2a and 2b are supported in a fixed position opposite ends of coating head T.

Located in the frame extension at the righthand side of the coating head T as viewed in FIG. 2, is one of the multiple tension-compensating devices of the invention consisting in a cross tensioning roll assembly F1 and located at the opposite side of the coating head T is a second linear tensioning roll assembly F2.

The cross tensioning roll assembly F1 includes as a principal component a rotating bowed expander roll R5 which has opposite extremities received in bearings in a roll stand 100. The expander roll extremities are provided with vertical adjustment means 102 for raising and lowering the roll R5. Also provided are lateral adjustment means for moving the roll R6 into and out of a skewed position. Operating wheels RW1 are fixed to control rods as 104 having bevel gears 106 for facilitating manual adjustment of the roll R5.

It is pointed out that the axis of rotation of roll R5 is located substantially below the top of coating head T but is in close proximity to this member so that as a result the web W is subjected to cross tensioning and transverse stretching forces and almost instantly while in a stretched state the stretched web moves over and around the coating head T.

In thus subjecting the web to cross tensioning forces, I may vary the stretching action by raising and lowering the roll R5 as may be required from time to time and I may also increase the cross tensioning action by moving the roll R6 laterally into and out of skewed positions and I may also employ additional rolls in a skewed position.

The linear tensioning roll assembly F2 includes a roll member R6 rotatably mounted in a roll stand 108 in suitable bearing members which can be adjusted toward and away from the coating head T by means of an operating wheel RW. The linear tensioning roll R6 is located with its lowermost peripheral portion occurring well below the top of the coating head T so that a linear tensioning force can be exerted downwardly of the coating head T and more importantly while the web is in a cross tensioned or stretched condition constantly controlled by the bowed expander roll.

I have determined that by combining the multiple tensioning means noted with the coating head T in the relative positions to one another described, a novel and important multiple tensioning effect is realized. This multiple tensioning acts on the web W as it leaves the supply roll E and approaches the coating head T and operates initially to exert cross tension force of a magnitude which may stretch the web transversely in sufficient degree to overcome variation in caliper and length of the web.

The controlled cross tensioning step of the invention is, as earlier noted, essential to successful use of linear tensioning of the web and makes it possible for linear tension as further exerted by the assembly F2 to force the transversely stretched web uniformly against the coating head with adequate pressure to equalize and balance varying pumping pressures developing along the coating head.

In controlling web tension and web pressure in order to overcome difficulties arising out of the use of high viscosity coating material utilized at relatively high flow rates there may develop conditions where the necessary web pressure requires a web tension which exceeds the tensile strength of the web to be coated and frequent breaking or tearing can occur.

Figures 15, 16:
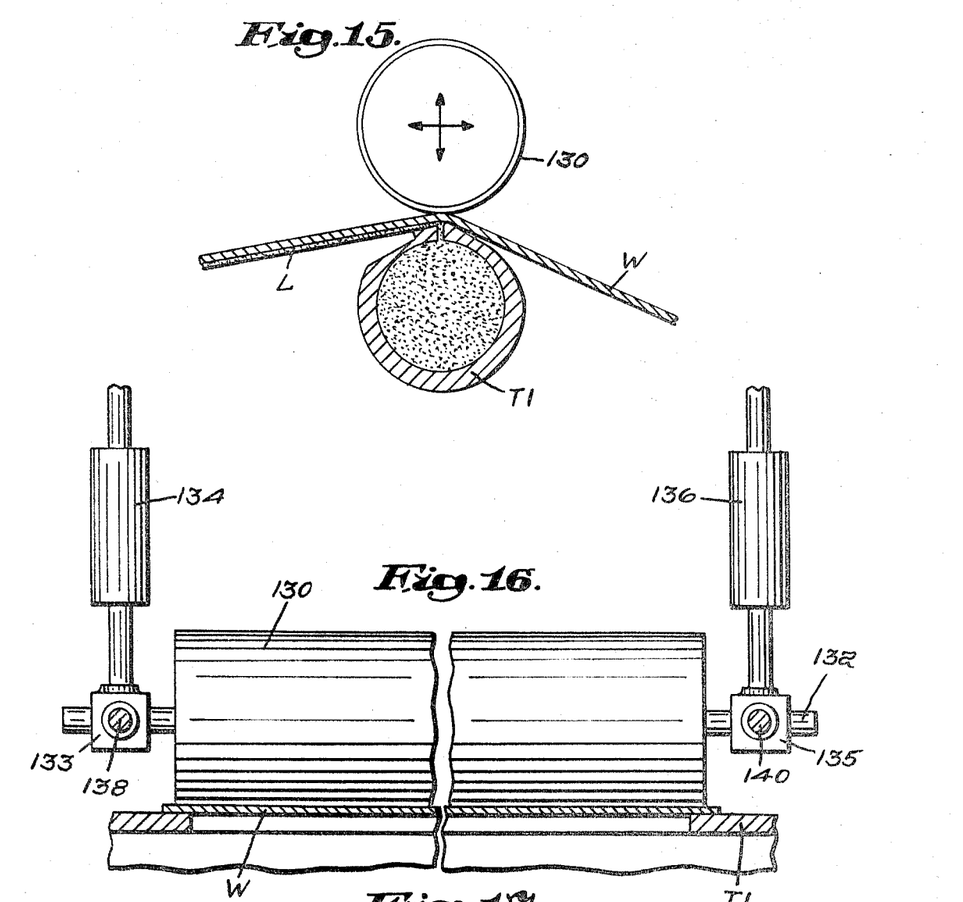
FIG. 15 is a detail cross sectional view of a modified form of coating head apparatus which includes a special web press roll member.
FIG. 16 is a fragmentary elevational view further illustrating the coating head and web press roll apparatus of FIG. 16.
Figure 17:
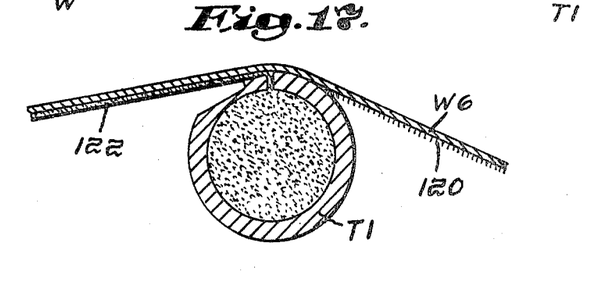
FIG. 17 is a detail cross sectional view illustrating diagrammatically a web fibre ironing step.

To deal with this problem, I have devised auxiliary web press means for increasing web pressure while still regulating linear and cross tensioning in the web itself. A preferred web press means is illustrated in FIGS. 15–17 mounted above a coating tube T1 and includes essentially a web press roll 130 which is supported on a shaft 132. Opposite extremities of shaft 132 are provided with bearing blocks 133 and 135 adjustably suspended from pneumatic cylinders 135 and 136 adapted to be supported on the frame sides 2 and 2'. The bearing blocks 133 and 135 are adjustably secured on rods 138 and 140 and by means of the mounting arrangement devised, the web press roll 130 can be adjusted forwardly and rearwardly above the coating head T1 as shown in FIG. 15. In these positions of adjustment, the roll 130 may be pressed downwardly with varying degrees of pressure as desired on the upper side of web W to maintain the web at a suitable position over the coating aperture. I may desire to positively drive the web press roll under certain circumstances and vary the diameter through a range of sizes.

I find that by thus combining web press roll pressure with cross tensioning and limited linear tensioning, the problem of web breaking can be avoided with uniformity of coating thickness being effectively maintained, and I may also desire to employ the web press roll for various other coating requirements.

Considering in further detail the coating head assembly T, there is included in this assembly a tubular element T1 having a specially formed elongated aperture and adjacent land surface by means of which a precisely metered quantity of coating substance supplied by the pump P may be applied to a web and desirably smoothed out. Numeral 40 denotes the aperture which is more clearly shown in FIGS. 4–11 inclusive and is located at the upper side of the tubular element T1.

Figure 4:
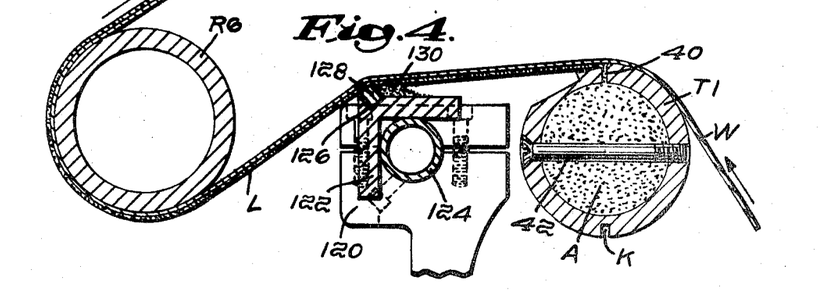
FIG. 4 is a vertical cross sectional view showing details of the tubular coating head and a web in a coating position.
Figure 5:
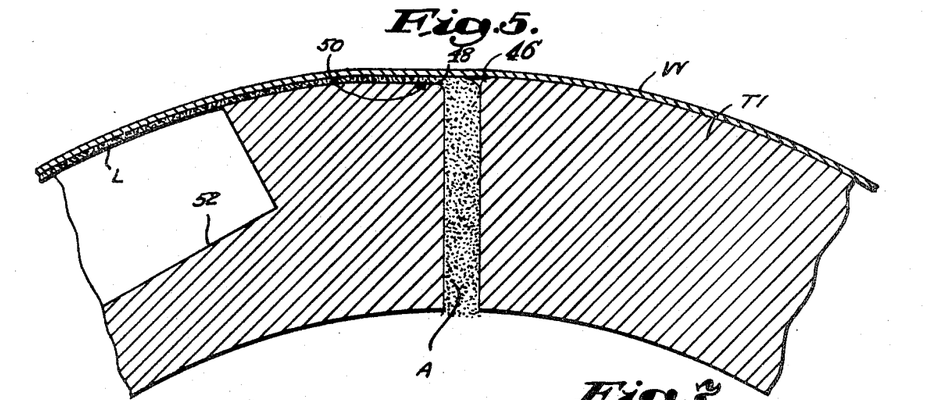
FIG. 5 is an enlarged vertical cross sectional view further illustrating portions of the coating head and web of FIG. 4.
Figure 7:
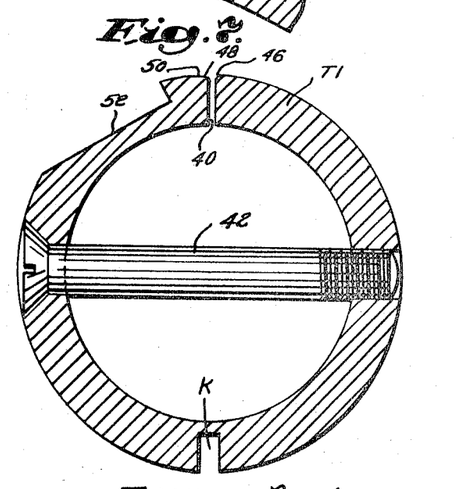
FIG. 7 is a cross sectional view of a tubular component shown removed from its supporting structure.
Figure 8:
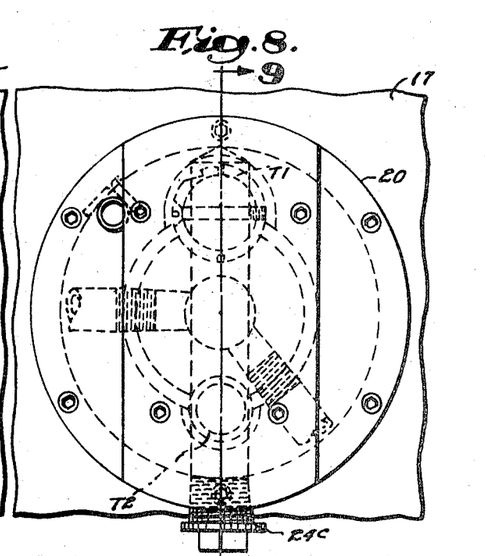
FIG. 8 is a fragmentary elevational view of the coating head shown with heating means associated therewith.

The tubular element T1 is constructed as a cylindrical body which is open at opposite ends and along its upper side. There is thus defined a confined space having an aperture 40 as shown in FIG. 7. Opposite edge portions of this aperture 40 are adapted to be secured in circumferentially adjustable relation to one another by means of adjustment screws as 42 located transversely through opposite sidewall sections as shown in FIGS. 4 and 7. By adjusting these screws the width of the elongated aperture 40 may be varied as desired.

I also provide between these adjustable sidewall sections filler strips as 44 (FIG. 6) which operate to close the aperture 40 at opposite ends of the tubular element so that the quantity of a coating to be applied from the aperture 40 may extend over a greater or lesser area.

The aperture 40 is further defined by a special metering edge construction incuilding a relatively high lead-on edge 46 over which a web of material is led to the coating substance, and a relatively low lead-off edge 48 over which the web and an applied layer of material is led away.

It is pointed out that when a web is moving over the tube T1 the relative difference in height between the lead-on edge 46 and the lead-off edge 48 provides for the formation of a short restricted passageway into which freshly coated underside portions of the web may move without the coating being drawn across a sharp edge. It will also be observed that this restricted passageway tends to become larger if the flow of the coating substance extruded through the aperture 40 increases.

Figure 6:
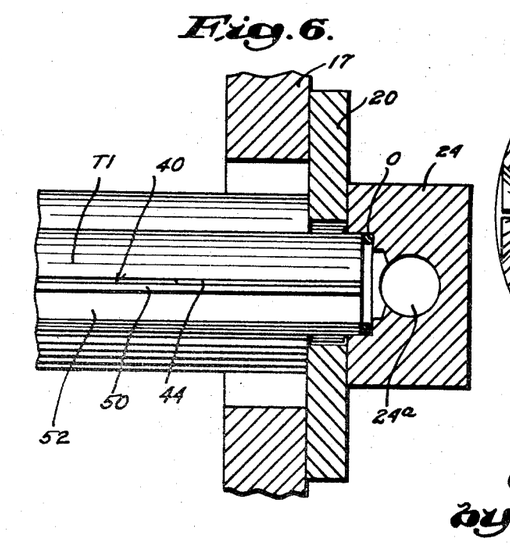
FIG. 6 is a fragmentary cross sectional view of the applicator head taken approximately on the line 6—6 of FIG. 9.

In combination with this relatively lower lead-off edge construction, I have further provided a novel land surface construction which is denoted by numeral 50 more clearly shown in FIGS. 6 and 7 and consisting of a relieved relatively flat area which extends away from the aperture for a short distance to become terminated at a recessed portion 52. This land surface is designed to smooth and level a coated surface of a web passed thereover and to set the coating substance firmly against the web.

Another feature of the invention is the provision of pressure equalizing means for the member T1 embodied in the construction and operation of the tubular coating apparatus T as shown in greater detail in FIGS. 4–11 inclusive. As noted therein member T1 is located in a special mounting assembly supported at the front of the frame as shown in FIG. 3 in bearing plates 15, 17.

Figures 11, 12:
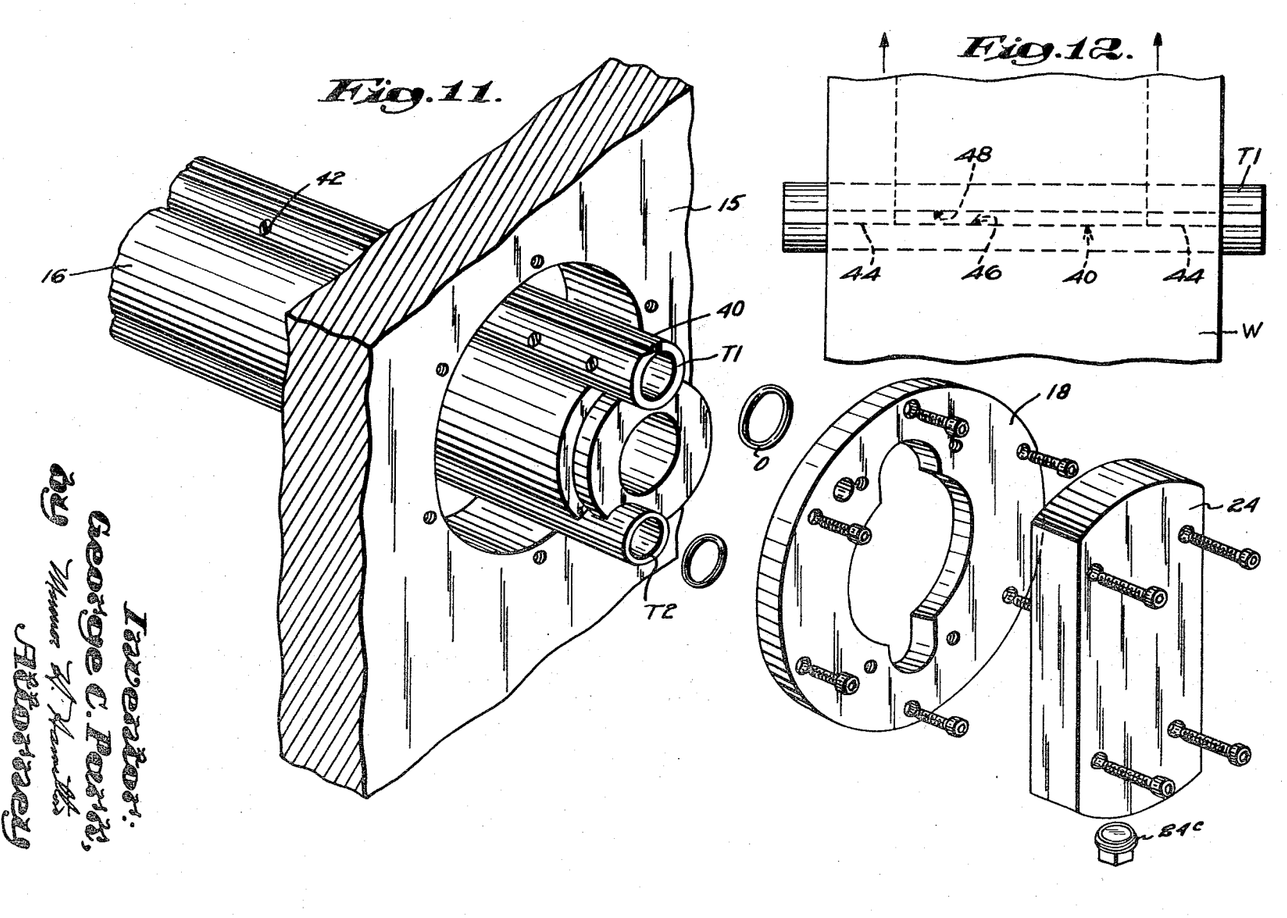
FIG. 11 is an exploded view of the coating head components, portions of which are indicated fragmentarily.
FIG. 12 is a fragmentary detail plan view illustrating a web of paper in an operative position relative to the coating tube.

Included in this assembly is a heat conducting bed tube 15 which, as shown in FIG. 11, is formed along its upper and lower sides with curved recesses in which are supported respectively the tubular coating device T1 and a second tubular member T2. Opposite ends of members T1, T2 and bed tube 16 are received through collar members as 18 and 20 adapted to be bolted to the bearing plates 15 and 17. Secured outside the ends of the bed tube 16 and tubes T1 and T2 are closure members 22 and 24.

Figure 9:
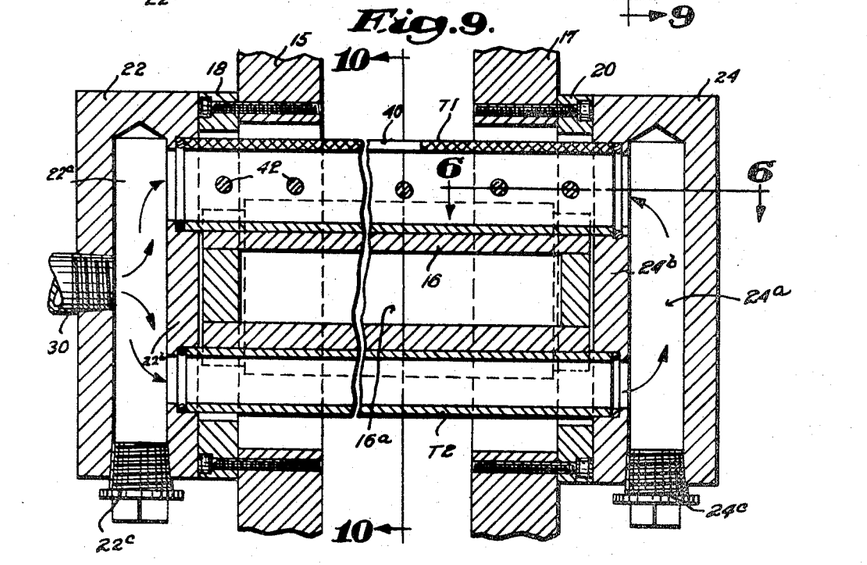
FIG. 9 is a cross sectional view taken on the line 9—9 of FIG. 8.
Figure 10:
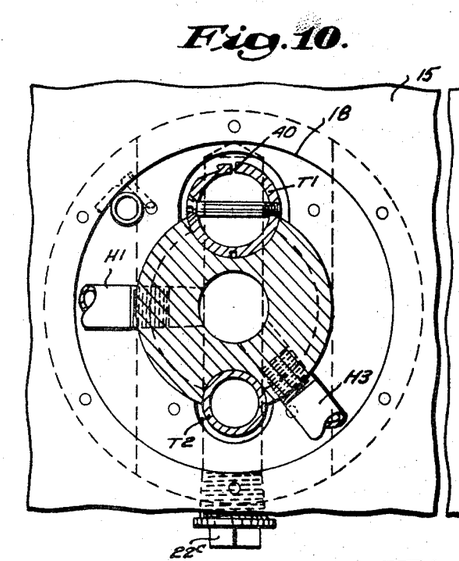
FIG. 10 is a cross section taken approximately on the line 10—10 of FIG. 9.

As will be observed from an inspection of FIGS. 9 and 11, these closure members 22 and 24 are formed with internal passageways 22a and 24a which communicate with tubular members T1 and T2. The closure members 22 and 24 are further formed with central plug sections 22b and 24b which are constructed and arranged to fit and seal respective opposite ends of a steam chamber 16a of the heat conducting member.

By means of this arrangement steam for heating the bed tube 16 may be introduced through inlets H1, H2 into a steam chamber 16a and removed from an outlet H3. There is thus provided a means of transmitting heat to each of the tubes T1 and T2 in order to maintain at a desired temperature a body of coating substance in the tubes T1 and T2.

As shown in FIG. 3, a supply of the coating substance is pumped from the supply source S by pump P through a feed pipe 30 (FIG. 9) into passageway 22a. Valve V₁ opens and closes the feed pipe while V₂ provides for recirculating material through pump and strainer. A portion of the coating substance passes from passageway 22a into the tube T1 while another portion of the coating substance passes through the tube T2 into the passageway 24a and then into an opposite end of tube T1. With this arrangement it will be observed that there is no opportunity for pressure to drop from frictional losses in forcing material into tube T1.

A further feature of the coating means of the invention is the arrangement of parts in the tube T1. As noted in FIGS. 6 and 7 the tube T1 is split along its upper side and formed with a kerf K at its bottom side so that the split may be opened or closed by turning adjustment screws 42. The pressure thus exerted squeezes the filler strips 44 to prevent escape of liquid material at these points. Opposite ends of T1 are further fitted with sealing rings O which seal against end closure members 22 and 24.

In some coating operations where conditions tend to increase the likelihood of streaks or ridges in an applied coating, I may desire to combine with the coating tube T1 a special coating leveller device which is illustrated in FIG. 4. This device includes an adjustable block 120 mounted in close proximity to tube T1 and having adjustably secured therein an L-shaped bar 122 mounted over a tube 124. Formed in the L-shaped bar along one edge is a V groove 126 in which is loosely contained a levelling rod 128. I find that this levelling device may be set to engage a freshly coated web and the loosely disposed rod will function to spread out small quantities of fluid which accumulate as a small excess body 130 all along back of the rod and this excess body tends to provide a uniform levelling action of a desirable nature.

In carrying out the method of the invention, a supply of high viscosity heated coating substance is pumped into the tubes T1 and T2 to provide uniform pressure all along tube T1. The coating substance is constantly maintained at a desired temperature by the heat conducting tube 16. At the same time the web W of paper is guided into contact with a nip roll R3 and a preheating roll R4 and then through the multiple tensioning means and coating head T as earlier described. At the point the web is caused to move through an arcuate path of travel which provides for a predetermined amount of contact or "wrap-around" of the paper with respect to the tube T1 and which may extend over an arc of 45 degrees or more.

It is pointed out that the wrap-around of the web may be controlled to not only convert the tube T1 into a closed container with resultant pressure equalization, but may also provide a highly beneficial effect in laying down heated fibres of rough surfaced webs immediately prior to application of coating. This prevents fibres from remaining erect and penetrating the coated layer to permit wicking and thus destroy the barrier properties of the coating. This fibre-ironing action is illustrated diagrammatically in FIG. 17 in which fibres 120 in a web W6 are laid down and held while coating layer 122 is applied from coating tube T1.

As shown in FIG. 12, for a given width of a web W which is to be coated, the length of aperture 40 is controlled by use of filler pieces 44 so that opposite edges of the web W will overlap the filler strips and when held under a suitable tension will tend to seal the area of elongated aperture 40 and constitute the space within the member T1 as a closed volume. By this means uncoated strips may be left on the web with a minimum of difficulty.

In accordance with a preferred form of the invention, the pump P is regulated so that a substantially constant rate of flow of coating substance is delivered to the member T1 and at a predetermined pressure which is of a magnitude such that it exceeds slightly the radially inwardly directed force component of the tensioned web of paper W. Pressure thus induced raises the paper a distance above the aperture 40 which generally corresponds to the thickness of a layer of coating substance desired to be applied to the underside of the paper. In this way, I am enabled to apply only a desired amount of coating substance and the web is never "flooded" and therefore does not require scraping with a doctor blade.

As this metered quantity of coating is removed from the top of the body of coating substance in opening 40 and applied to the web, it is almost instantly moved in over the relatively low lead-off edge 48 and then through the short restricted passageway comprised by the land surface 50 and the moving web itself. While passing through this passageway, the coating is levelled, compressed and smoothed against the land surface 50 and set into the paper to eliminate any irregularities. A desirable result of this passageway is that small particles which may occur in the coating substance are carried off in the coated layer without collecting on the lead-off edge to cause streaking.

In thus providing the passageway noted, I have found that improved results may be obtained by having the lead-off edge 48 spaced lower than the lead-on edge 46 a distance lying in a range of from .005 to .007 inch. A typical coating weight resulting from a pumping rate employed in forcing the coating material through the elongated aperture 40 may be expressed as quantity of material applied, e.g., as five pounds per thousand square feet for a sixtyinch web travelling at a rate of 600 feet per minute. This provides a coating thickness of approximately .001 inch. An optimum land surface is one extending for a distance of one-eighth inch between the lead-off edge 48 and the point of recess which forms the surface 52. The web is in contact with the coating tube T1 a total not exceeding one and three-quarter inches in the direction of its movement.

The web with coated layer L leaves the tube T1 somewhat abruptly at the point of the recessed part 52 after having passed along the land surface 50. Further movement is in a straight path of travel to the roll T6 for a short interval of time after which the web is turned and guided in a reversed path of travel. This reverse path of travel coming immediately after the coating step tends to extend and stretch the coating L in a desirable degree. After having thus been turned the web and the stretched coating thereon passes to roll R1 and then to roll R which is constantly cooled to a desired temperature whereby the layer L of coated substance may be shock chilled and set to a desired condition while still in a relatively stretched state.

The combined effect of reversing the web to stretch the layer L and almost immediately thereafter shock chilling the partially set or hardened material prevents any tendency for curling of the paper to develop as the layer L becomes fully conditioned. As a result, I may, by controlling the stretching of the layer and its time of setting provide a paper stock which will remain flat in sheet form.

While satisfactory results for some coating operations may be achieved using the equipment as described above, I have determined that in many cases where high viscosity coatings are applied at relatively high flow rates, a more precise control of web speed and pumping rates is required for most efficient machine operation. With this in mind, I have further devised a method and means for synchronizing web speed and pumping rate in pounds per minute in an accurately controlled manner.

Figure 13:
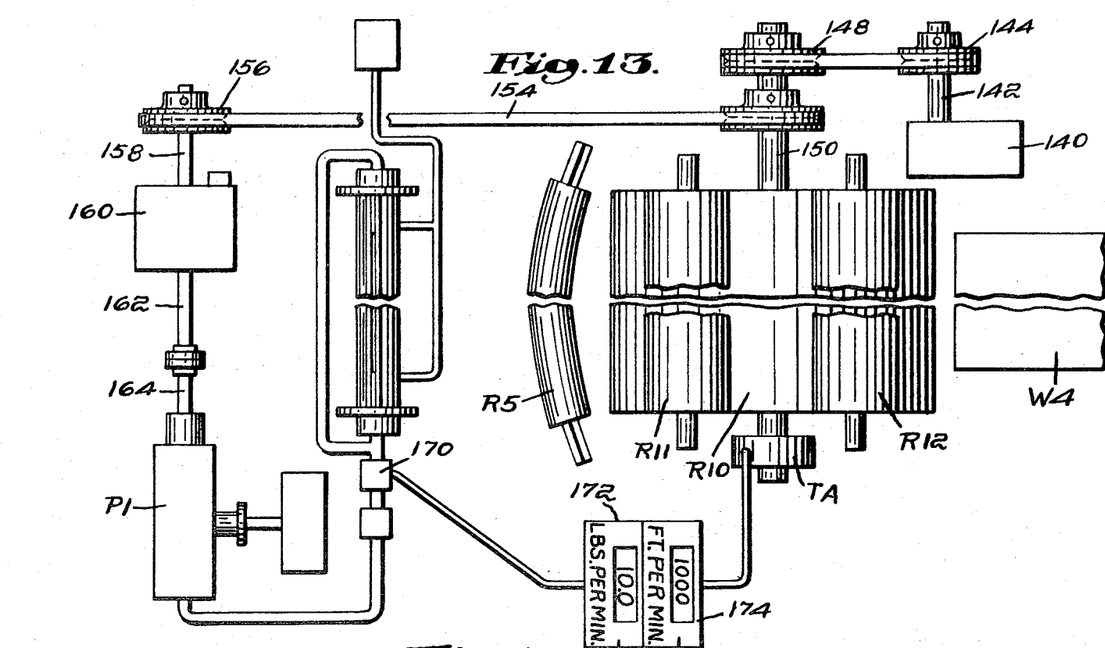
FIG. 13 is a plan view illustrating diagrammatically power driven components of the coating apparatus connected in interlocking driving relationship for synchronizing web speed and pumping rates in a visually indicated manner.

Attention is directed to FIG. 13 wherein I have illustrated an arrangement for interlocking the actuating means for a pump P1 with the drive means for winder rolls R10, R11, R12. As shown in FIG. 13 a variable speed motor 140 drives a shaft 142 having a sprocket 144 and a chain 146. The chain 146 meshes with a sprocket 148 on shaft 150 which carries winding roll R10. A sprocket 152 on shaft 150 drives a chain 154 which in turn drives a sprocket 156 on a shaft 158. The shaft 158 is connected to a variable speed transmission member 160 in turn connected to a shaft 162 coupled to the pump drive 164. By means of the arrangement described, the pump rate in pounds per minute can be set to a desired value for any given web speed and the two will then move in constantly maintained synchronized relationship.

I find that this synchronized operation performs very satisfactorily with the multiple web tension and web pressure controls earlier described to control coating weight uniformly.

I have also devised special indicator means including a flow-meter 170 connected into the pumping line to the tube T1 as shown in FIG. 13 and having a connection to an indicator device 172 which automatically indicates pumping rate in pounds per minute in response to changes in the flow-meter readings. Also combined with the indicator device 172 is a second indicator means 174 which, by means of a suitable tachometer device, senses the rate of speed of the shaft 150 and translates the speed into a reading of feet per minute of travel of web W4. Thus it affords a convenient and extremely useful indicator for visually indicating to a machine operator readings in web speed and pumping rate.

In a typical instance of carrying out a coating operation with mechanism for synchronizing both web speed and pumping rate as described above, a roll of material is put in place in the rollstand V. A web of the material is drawn off at a desired web speed and limited tension is exerted by the multiple tensioning means of the invention until the web runs through without the edges being skewed. Then the pump speed is set to operate at a rate which will furnish a required coating weight in pounds per square feet. Thereafter linear tension is increased gradually until the longitudinal cross section profile of the web is uniform. This is determined by blanking or cutting out small samples of the coated web and weighing these samples to check on uniformity. Finally with web speed, linear tension and pumping rate adjusted correctly, cross-tensioning is adjusted to provide a uniform cross section profile as determined by cutting samples a second time and checking their weight. In FIG. 1, one form of cutout samples Y are indicated diagrammatically to illustrate these profile measuring operations. With these conditions having been established, I may increase or decrease the pumping rate to obtain heavier or lighter coatings as desired with uniformity being preserved.

Figure 18:
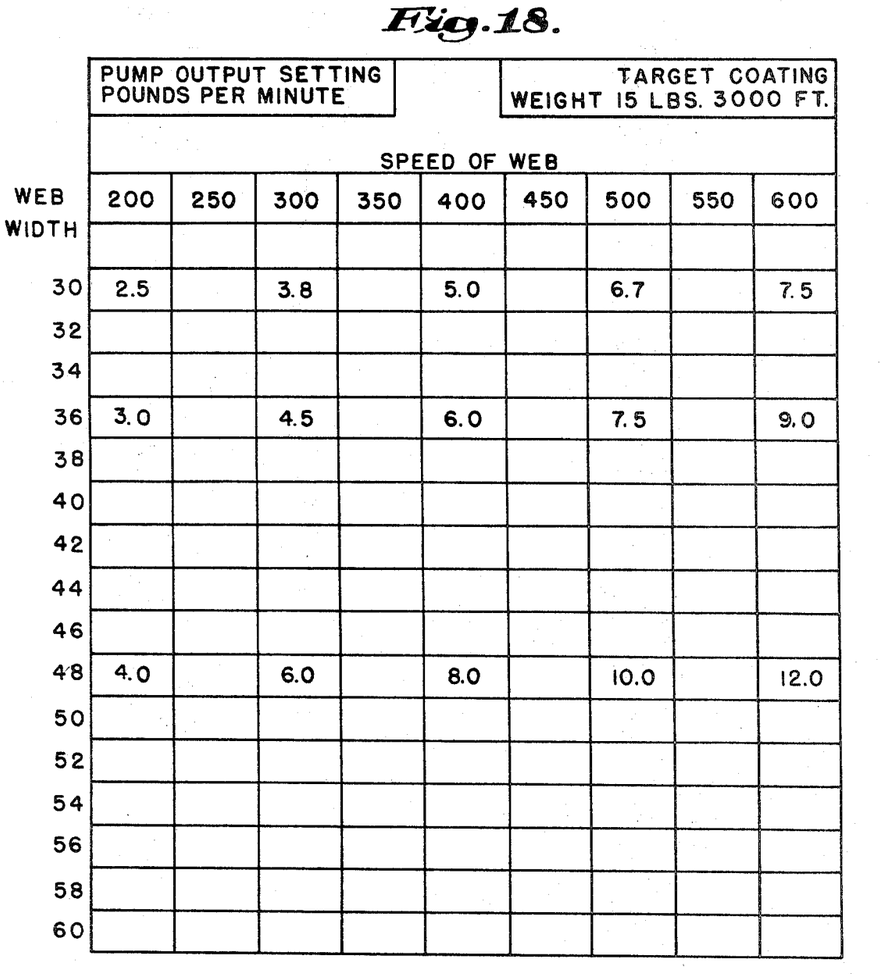
FIG. 18 is a diagrammatic view illustrating an operator's chart for one specific coating operation.

I also provide chart means for use with the indicator device described and one typical chart is illustrated in FIG. 18. As shown therein the chart presents tabulated data in the form of pounds of coating material applied per minute for any given set of web widths and web speeds. By inspecting a chart of this nature for any specific coating operation, the operator may readily adjust the pumping rate to a required value to obtain the coating weight desired. It will be understood that for each coating weight desired, there will be a separate chart to be referred to as desired. This system of measuring flow rate and web speed lends itself readily to automation.

Figure 14:
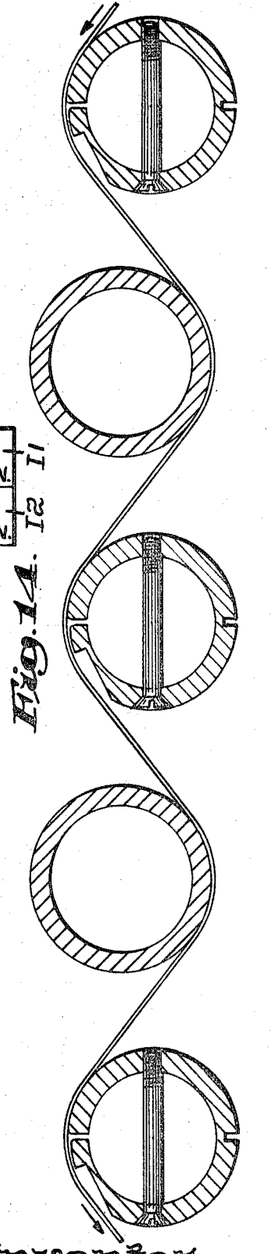
FIG. 14 is a cross section illustrating diagrammatically a multiple coating operation.

In FIG. 14, I have illustrated a method of applying successive coatings, one over another, using the tension control devices and coating head of the invention. I have found that by applying a heated coating of a high viscosity hot-melt compound as described, it becomes possible for a first coating, while still in a partially set and slightly tacky state, to move over the coating head and pick up another layer of coating material which is controlled as before by the web pressure and synchronized pumping speed and web speed. As a result, I may successively apply different types of barrier coatings with excellent results.

From the foregoing description of the apparatus and method of the invention, it will be apparent that I have disclosed an improved and highly efficient coating method and apparatus by means of which a metered quantity of material may be constantly applied without interruption and without the accumulation of streaks or lines in the coating. The method makes possible a highly uniform coating thickness and at the same time, limits penetration and possible curling.

I claim:

1. In a method of applying a heated thermoplastic coating material to a moving web of material in which the web is passed over a stationary tubular coating device having a coating material chamber which is open at its upper side to define an elongated aperture of uniform width throughout its length, said aperture being defined by a lead-on edge and a spaced lead-off edge, the steps which include continuously pumping into two opposite ends of the tubular coating device a heated liquid coating material which is confined in the tubular device under a controlled pumping pressure, transversely stretching the web as it approaches the coating device by engaging the web with a bowed expander roll revolving about a horizontal axis which is located below the longitudinal axis of the coating device, guiding the web under tension upwardly along an arcuate path into sliding contact with the coating device for a substantial peripheral distance immediately preceding the said elongated aperture, then over the relatively high lead-on edge, and then downwardly and in spaced relation to the relatively low lead-off edge whereby the web is yieldedly held in contact with the lead-on edge of the coating device and an appreciable portion of the coating device immediately preceding the lead-on edge to exert an inwardly directed force component, guiding the web of material away from the lead-on edge in spaced relation to the said lead-off edge to yieldably contain the coating material in a short restricted passageway, regulating the tension in the web and its resulting inwardly directed force throughout the width of the web while simultaneously controlling the rate of flow of said coating material into the tubular coating device to exert a desired pressure of a magnitude which exceeds slightly the radially inwardly directed and regulated force component of the tensioned web thereby to raise the web at all points along its transverse width a predetermined uniform distance above the elongated aperture, and transferring to the web a desired quantity of coating material which is distributed in accordance with the said regulated tension and pumping pressure forces and which forms a coated layer whose thickness throughout the width of the web is uniform and substantially corresponds to the said predetermined distance through which the web is raised.

2. In a method of applying a heated thermoplastic coating substance to a moving web of material in which the web is passed over a tubular coating device having an elongated aperture defined by a lead-on edge and a relatively lower lead-off edge, the steps which include continuously introducing through two opposite ends of the tubular coating device a heated liquid coating substance which is contained in a confined space in the tubular device under a controlled pressure, moving the web of material under tension along an arcuate path of travel over the relatively high lead-on edge and in spaced relation to the relatively lower lead-off edge to yieldably contain the coating material in a short restricted passageway, controlling the flow of said coating material into the tubular coating device to exert a predetermined pressure of a magnitude which exceeds slightly the radially inwardly directed force component of the tensioned web thereby to raise the web a predetermined distance above the elongated aperture and to apply to the web a coating whose thickness generally corresponds to the said predetermined distance, said coated web as it passes away from the tubular coating device is led along a reversely curved path of travel to stretch the coated layer while undergoing hardening, and then bringing the web and partially hardened layer of coating into contact with a chilled roll surface to set the coated layer while in a curved position to compensate for subsequent contraction and provide a curl-resistant sheet.

3. In a method of coating a web in which the web under tension is passed over a series of coating heads to exert a web pressure and the coating heads are formed with elongated discharge apertures through which coating fluid is discharged at a pressure which exceeds the web pressure, the steps which include subjecting the web to cross tensioning forces exerted from one side of the coating heads and of a magnitude to transversely stretch the web and to overcome variations in caliper and length of the web as it approaches each of the coating heads, and simultaneously regulating tension exerted linearly of the web from an opposite side of each of the coating heads to control the web pressure of the cross-tensioned web while it is transversely stretched and in contact with each of the coating heads, thereby to compensate for variations in pressure occurring from the ends of each of the coating heads toward the center thereof, the advancing web thereby receiving successive coatings superimposed one upon another, the first coating being in a tacky state at the time the next subsequent coating is applied to the web.

4. In a method of applying a heated thermoplastic coating fluid of viscous material to a moving web of material from a heated coating tube having an elongated discharge aperture through which the coating fluid is pumped under pressure which may vary in intensity along the said aperture, and in which method the web is continuously drawn off from a supply roll at a predetermined rate of travel by means of a power-driven winding roll apparatus, the steps which include, advancing the web from the supply roll, guiding the web over an adjustable rotating bowed expander roll to exert cross-tensioning forces, passing the transversely stretched web through an adjustable linear tensioning device arranged in spaced relation to the bowed expander roll to stretch the web longitudinally immediately after it has ben subjected to said stretching forces exerted transversely thereof, engaging portions of the web occurring between the bowed expander roll and the tension device around the coating tube to force the tensioned web portions against the elongated discharge aperture under pressure, controlling the pumping rate of discharged coating fluid in synchronized relation to the speed of travel of the web to exert a pressure which exceeds the pressure of the tensioned web against the coating tube thereby to apply a metered layer of coating fluid to the web, and continuously regulating web pressure against the coating tube in accordance with the web speed and synchronized pumping pressure to maintain the metered layer of coating fluid in a uniform thickness at all points both transversely and longitudinally along the web.

5. A method according to claim 4 in which an exposed surface of the web, while maintained under tension, is subjected to adjustable rolling pressure along a line of engagement with the web occurring immediately above the said discharge aperture.

6. A method according to claim 4 in which the step of continuously regulating web pressure includes maintaining the web under tension exerted both linearly and transversely while simultaneously subjecting an exposed surface of the web to rolling pressure exerted along a line of engagement with the web occurring immediately above the said discharge aperture.

References Cited

UNITED STATES PATENTS

| | | | |
|---|---|---|---|
| 1,361,932 | 12/1920 | VanAvermaete | 118—410 |
| 2,464,771 | 3/1949 | Van Guelpen | 118—410 |
| 2,474,691 | 6/1949 | Roehm | 118—410 |
| 2,727,488 | 12/1955 | Nevim | 118—410 |
| 2,744,492 | 5/1956 | Enzmann et al. | 118—10 |
| 3,107,191 | 10/1963 | Brownold | 156—244 |
| 3,227,136 | 1/1966 | Bartlett et al. | 118—410 |

FOREIGN PATENTS

| | | | |
|---|---|---|---|
| 752,276 | 10/1956 | Great Britain | 18—12 |
| 892,799 | 3/1962 | Great Britain | 117—111 |

OTHER REFERENCES

Pulp & Paper, Apr. 3, 1961, pp. 54–57.

RALPH S. KENDALL, Primary Examiner

U.S. Cl. X.R.

117—111, 120; 118—7, 34, 101, 123, 124, 410, 411